US010272664B2

United States Patent
Hays et al.

(10) Patent No.: US 10,272,664 B2
(45) Date of Patent: Apr. 30, 2019

(54) FABRICATION OF 3D OBJECTS VIA MULTIPLE BUILD PLATFORMS

(71) Applicant: Xactiv, Inc., Fairport, NY (US)

(72) Inventors: Dan A. Hays, Venice, FL (US); Peter J. Mason, Fairport, NY (US); James Mason, Victor, NY (US)

(73) Assignee: Xactiv, Inc., Fairport, NY (US)

( * ) Notice: Subject to any disclaimer, the term of this patent is extended or adjusted under 35 U.S.C. 154(b) by 344 days.

(21) Appl. No.: 14/994,180

(22) Filed: Jan. 13, 2016

(65) Prior Publication Data

US 2016/0200084 A1    Jul. 14, 2016

Related U.S. Application Data

(60) Provisional application No. 62/103,269, filed on Jan. 14, 2015.

(51) Int. Cl.
*B29C 64/153* (2017.01)
*B29C 64/182* (2017.01)
(Continued)

(52) U.S. Cl.
CPC ............ *B33Y 30/00* (2014.12); *B29C 64/153* (2017.08); *B29C 64/182* (2017.08);
(Continued)

(58) Field of Classification Search
CPC ..... B29C 64/10; B29C 64/141; B29C 64/153; B29C 64/171; B29C 64/176;
(Continued)

(56) References Cited

U.S. PATENT DOCUMENTS

| 5,088,047 A | 2/1992 | Bynum |
| 5,593,531 A | 1/1997 | Penn |

(Continued)

OTHER PUBLICATIONS

Specification, drawings, and Filing Receipt of co-pending U.S. Appl. No. 14/994,178. EFS file name: 20160330_14-994180_NPL_cite1_XAC107.pdf.
(Continued)

*Primary Examiner* — Michael A Tolin
(74) *Attorney, Agent, or Firm* — John M. Hammond; Patent Innovations LLC

(57) ABSTRACT

A method is disclosed for improving the productivity of digitally fabricated 3D objects with the same or different shape and material composition. The improved productivity is enabled by the incorporation of multiple build platforms and multiple objects per build platform within a 3D object fabrication apparatus. Some 3D manufacturing processes such as those based on electrophotography require a wait time to condition the build object before the next layer of build and support material can be applied. Under these fabrication conditions, the utilization of multiple build platforms in the 3D object manufacturing process effectively minimizes the wait time between layer deposition so that the productivity for fabricating 3D objects is improved. Furthermore, the incorporation of an additional adjacent set of multiple platforms enables rapid changeover when the fabrication of one set of 3D objects is completed on an adjacent set of build platforms.

17 Claims, 9 Drawing Sheets

(51) Int. Cl.
*B29C 64/205* (2017.01)
*B29C 64/236* (2017.01)
*B29C 64/241* (2017.01)
*B33Y 10/00* (2015.01)
*B33Y 30/00* (2015.01)
*G03G 15/22* (2006.01)
*G03G 15/16* (2006.01)

(52) U.S. Cl.
CPC .......... *B29C 64/205* (2017.08); *B29C 64/236* (2017.08); *B29C 64/241* (2017.08); *B33Y 10/00* (2014.12); *G03G 15/1625* (2013.01); *G03G 15/224* (2013.01); *G03G 2215/1695* (2013.01)

(58) Field of Classification Search
CPC ... B29C 64/182; B29C 64/188; B29C 64/194; B29C 64/20; B29C 64/205; B29C 64/227; B29C 64/232; B29C 64/236; B29C 64/241; B29C 64/245; B29C 64/295; B29C 67/0074; B29C 67/0077; B29C 67/0081; B29C 67/0085; B33Y 10/00; B33Y 30/00; G03G 15/224; G03G 15/225
See application file for complete search history.

(56) References Cited

U.S. PATENT DOCUMENTS

| | | | |
|---|---|---|---|
| 6,066,285 A | 5/2000 | Kumar | |
| 6,780,368 B2 | 8/2004 | Liu | |
| 7,261,542 B2 | 8/2007 | Hickerson et al. | |
| 8,771,802 B1 | 7/2014 | Hays et al. | |
| 2013/0075022 A1* | 3/2013 | Chillscyzn | G03G 15/169 156/230 |
| 2013/0077996 A1 | 3/2013 | Hanson et al. | |
| 2014/0065194 A1* | 3/2014 | Yoo | B29C 67/0081 424/400 |
| 2015/0266241 A1 | 9/2015 | Batchelder | |
| 2016/0001534 A1 | 1/2016 | Taniuchi | |

OTHER PUBLICATIONS

Rojas et al., "Exploring Surface Defects on EP-based 3D-printed Structures," Journal of Imaging Science and Technology 58(2): 020506-1-020506-12, Sep. 24, 2014. EFS file name: 20160330_14-994180_NPL_cite2.pdf.

USPTO Abstract of Title for U.S. Appl. No. 13/624,507 of Chillscyzn et al. EFS file name: 20180606_14-994180_IDS_NPL_Cite1.

Press release by Stratasys, Inc. on Apr. 3, 2018 viewable at http://investors.stratasys.com/news-releases/news-release-details/stratasys-unveils-spin-evolve-addktive-solutions-focus-new-step. EFS file name: 20180606_14-994180_IDS_NPL_Cite2.

"Technology" web page of Evolve Additive Solutions, Inc. posted at https://www.evolveadditive.com/technology. EFS file name: 20180606_14-994180_IDS_NPL_Cite3.

Online trade publication posted at https://3dprint.com/208742/evolve-additive-solutions/, entitled, "Evolve Additive Solutions Emerges from Stealth with 50x Faster 3D Printing for Production." EFS file name: 20180606 14-994180_IDS_NPL_Cite4.

Web page of Vimeo, posting of videos entitled, "Evolve Additive Technology Movie," and "Evolve Additive Solutions Technology." Viewable at https://vimeo.com/user70853205. EFS file name: 20180606_14-994180_IDS_NPL_Cite5.

Web page of Vimeo, at which the video, "Evolve Additive Solutions Technology" may be viewed, at https://vimeo.com/232727784. EFS file name: 20180606_14-994180_IDS_NPL_Cite6.

\* cited by examiner

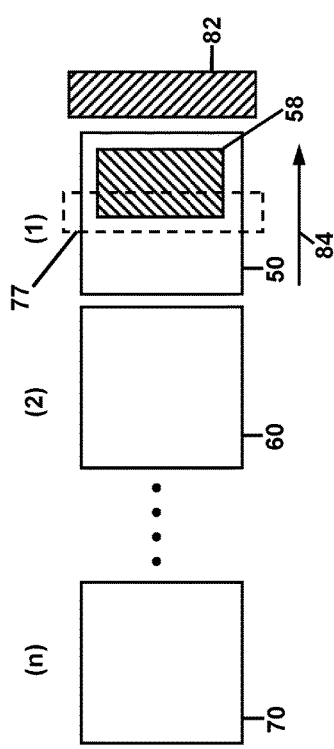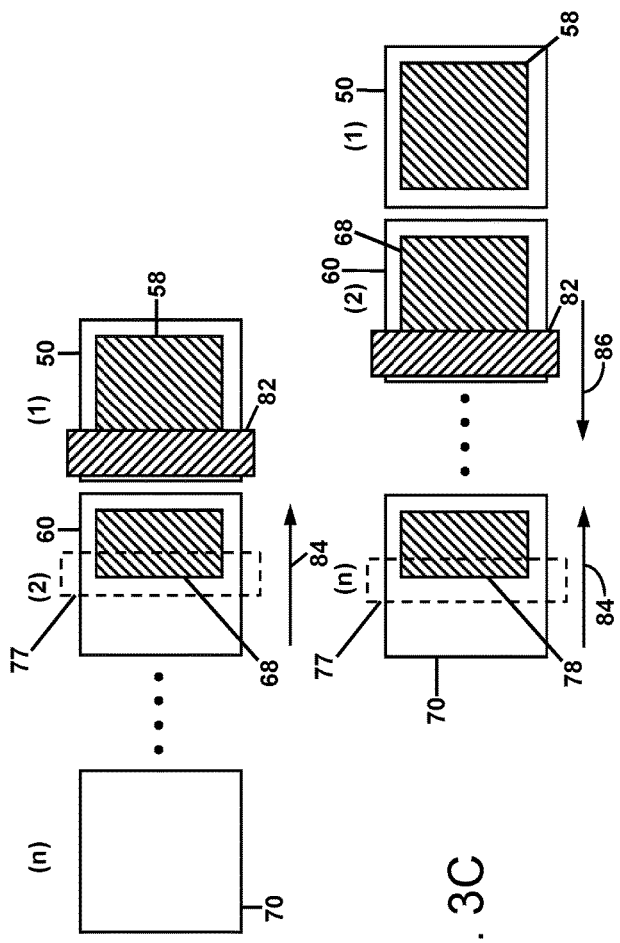

FABRICATION OF 3D OBJECTS VIA MULTIPLE BUILD PLATFORMS

CROSS-REFERENCE TO RELATED PATENT APPLICATIONS

This application claims priority to U.S. Provisional Patent Application No. 62/103,269 filed Jan. 14, 2015, the disclosure of which is incorporated herein by reference.

BACKGROUND

Technical Field

Devices for digital fabrication of three-dimensional objects by either selectively depositing or binding raw materials together in layers.

Description of Related Art

This disclosure relates to the modification of a process and apparatus for more efficiently manufacturing three-dimensional (3D) objects using digital fabrication methods. The 3D manufacturing process, also known as additive manufacturing, rapid prototyping, or solid free form, uses digital files that describe cross sections for building the desired part and support structure. Various 3D manufacturing methods have been proposed for digitally fabricating a uniquely shaped object on a single build platform. The build rate of digitally produced 3D objects is inherently slow since 1) each 2D cross section is typically formed by a two-dimensional scanning device and 2) many 2D layers (up to thousands in a high resolution part) are required to produce an object. Furthermore, some manufacturing methods require additional time to post-process a layer before deposition of the next layer. Regardless of the method for building the 3D object, there is a general need to implement process improvements for reducing the time to build multiple, uniquely shaped 3D objects.

Various additive manufacturing systems have been proposed to produce three-dimensional objects by either selectively depositing, binding or polymerizing raw materials together in layers. The various methods include fused filament extrusion, ink jetting, selective laser sintering, powder/binder jetting, electron beam melting, stereolithography and electrophotography processes. In general, the various methods tend to exhibit a slow build rate. For example, many of the selective deposition methods have a slow build rate since the deposition of the build and support materials is generally provided by a scanning head for extruding or jetting the material for each layer. To improve the build rate with a fused filament extrusion method, a 3D printer from Cartesio called the CartesioLDMP has multiple extruder heads for simultaneously printing multiple similar shaped 3D objects on a single stationary platform.

The 3D manufacturing method based on electrophotography has the potential of improving the build rate since it is well known from the electrophotographic industry that 2D layers of imaged powder can be formed and deposited in a time less than about half of a second. However, the 3D object build rate utilizing the electrophotographic method is decreased if a wait time required before depositing another layer is comparable to or greater than the build time for each layer.

The electrophotographic process can enable high 2D layer formation rates since the imaging of a uniformly charged photoreceptor is provided by light exposure from either a scanning laser beam or LED imaging bar. The deposition of powder material is provided by a high process speed powder development system. Typically, insulative powder is tribo-electrically charged in a development system. Electrostatic forces acting on the charged powder are used to develop an electrostatic image formed by laser or LED light exposure of a uniformly charged photoreceptor. Likewise, electrostatic forces are used to transfer the charged powder image on the photoreceptor to a medium such as paper or an intermediate roll or belt. The electric field for electrostatic transfer of the charged powder to the medium is typically provided by either depositing gaseous ions on the backside of the medium or applying an electrical bias to a stationary or roller electrode behind a belt or roll comprised of a charge-relaxable material or overcoating, respectively. In electrostatically transferring charged powder to a medium such as paper or an intermediate roll or belt, one can apply rather high electric fields (40 volts per micrometer) for efficient powder transfer without air breakdown limitations. The high transfer efficiency is not degraded in color electrophotographic printers that require the electrostatic transfer of several charged powder layers involving different combinations of cyan, magenta, yellow and black toner layers.

Although it is recognized that the electrophotographic process can enable rapid formation of 2D layers, a number of researchers have reported problems in producing arbitrarily thick 3D objects when using conventional electrophotography to produce charged powder depositions that are repeatedly electrostatically transferred and heat fused to the object being built. For example, a publication on "Transfer Methods toward Additive Manufacturing by Electrophotography" by Jones et al. in the conference proceedings of the Society for Imaging Science and Technology (IS&T), *NIP*27: 2011 *International Conference on Digital Printing Technologies*, pp. 180-184 reports the use of a conventional monochrome printer with conventional toner for repeatedly electrostatically transferring a uniformly deposited toner layer onto a moving platform and heat fusing the layer before the next deposition cycle. It was noted that after about 20 transfers, the surface had many defects and irregularities that compromise the quality of the object. It was remarked that every research group, to the author's knowledge, encountered the same type of surface defects when attempting to deposit non-conductive toner with stack heights in excess of 1 mm.

In spite of the surface defects problem encountered after many electrostatic transfers of charged powder to build an object, the effectiveness of the conventional electrostatic transfer process diminishes as thickness of the object increases. When the electrostatic force for transferring charged powder is provided by an electric field due to an electrical bias between the conducting substrate of the build object and the ground plane of the photoconductor, the applied electric field and correspondingly the electrostatic force decreases with increasing thickness of the object. Furthermore, the accumulation of charge on the object due to the charge on the transferred powder creates an electric field that suppresses powder transfer and therefore limits the thickness of the build object and causes irregularities in the surface. To suppress the build limitation due to charge accumulation on the object, the feasibility of using a corona (gaseous ions) charging device for charging the top layer of the object with a polarity opposite to that of the toner has been reported in a publication by A. Dutta on "Study and Enhancement of Electrophotographic Solid Freeform Fabrication" as a Masters of Science thesis in the Department of Mechanical and Aeronautical Engineering at University of Florida, Gainesville, Fla. in 2002. (See http://etd.fcla.edu/UF/UFE0000527/dutta_a.pdf.) The top charging method doubled the thickness of the build object from 1 mm to 2 mm before surface quality degradation was observed. Although objects thicker than 2 mm could be produced, the surface defects became exaggerated with each successive transfer. A publication by A. Kumar Das on "An Investigation on the Printing of Metal and Polymer Powders Using Electrophotographic Solid Freeform Fabrication" as a Masters of Science thesis in the Department of Mechanical and Aeronautical Engineering at University of Florida, Gainesville, Fla. in 2004 (See http://etd.fcla.edu/UF/UFE0005385/das_a.pdf) suggests that although the corona charging counteracted the powder charge in the initial layers, its effectiveness was diminished for a thicker object.

To circumvent the 3D object build thickness and surface irregularity problems associated with electric field transfer of charged powder from electrophotographic images to the build object, an alternative approach of using of heat and pressure to transfer the charged powder layers to a build object has been described by a number of researchers. The first to disclose the utilization of heat and pressure to build 3D objects from electrophotographic produced powder layers was Bynum in U.S. Pat. No. 5,088,047 (1992). This patent discloses the use of an electrophotographic print engine to deposit layers of toner on a TEFLON® (polytetrafluoroethylene) coated belt. Each layer on the belt was made tacky by heating or exposure to solvent vapor before being transferred to the build object with a combination of heat and pressure. Other relevant patents include U.S. Pat. No. 5,593,531 issued to Penn, U.S. Pat. No. 6,066,285 issued to Kumar, U.S. Pat. No. 6,780,368 issued to Liu and Jang, and U.S. Pat. No. 8,488,994 issued to Hanson et al. In these U.S. patents, a transfer medium is configured to receive and transfer imaged layers of a thermoplastic-based powder from an electrophotographic imaging engine. Before the imaged layer is transferred to the build object or support material, a heater is used to heat the imaged layers on the transfer medium to at least a fusing temperature of the thermoplastic-based powder. The system also includes a layer transfusion assembly comprising a build platform where the layer transfusion assembly is configured to transfuse the heated layers in a layer-by-layer manner onto the build platform to print the 3D object. The system usually also includes a post-transfusing cooling unit configured to actively cool the transfused layers to maintain the printed 3D object at about an average temperature that is below a deformation temperature for the 3D object. The utilization of heating and cooling cycles of the transfer medium and 3D part/support materials in the transfusion process builds in a wait time that limits the overall speed of the electrophotographic method for digitally producing 3D objects. The disclosures of these U.S. Pat. No. 5,088,047 of Bynum; U.S. Pat. No. 5,593,531 of Penn; U.S. Pat. No. 6,066,285 of Kumar; U.S. Pat. No. 6,780,368 of Liu et al.; and U.S. Pat. No. 8,488,994 of Hanson et al. are incorporated herein by reference.

Although there is no evidence from the Bynum patent that this disclosure was reduced to practice, the publication by Jones et al. on "Transfer Methods toward Additive Manufacturing by Electrophotography" in the conference proceedings of the Society for Imaging Science and Technology (IS&T), *NIP27: 2011 International Conference on Digital Printing Technologies*, pp. 180-184 indicates that other researchers have subsequently developed hardware and published experimental results using some combination of heat and pressure for transfer and fusing electrophotographic produced powder layers to produce 3D objects. For example, the Jones et al. 2011 publication describes the use of an industrial laser (electrophotographic) printer and infrared heaters to assess the maximum thickness one can achieve in building a 3D object according to the Bynum transfer approach. It was learned that stack heights are limited to about 1 mm to 2 mm before quality issues due to surface irregularities prevent further build thicknesses.

The fact that the quality of the 3D objects produced by the heat and pressure transfer method is not substantially improved over the quality of such objects produced by the electrostatic transfer method (including an electrostatic conditioning of the object during the building) has been discussed by Jones et al. in the conference proceedings of the Society for Imaging Science and Technology (IS&T), *NIP28: 2012 International Conference on Digital Printing Technologies*, pp. 327-331. The implication is that during the build of the 3D object, charge accumulation on the object due to the charge of the transferred powder and possible contact charging by the heated transfer roller is the cause of non-uniform transfer and consequently unacceptable 3D object quality when the build thickness is typically greater than about 1 to 2 mm. It was suggested that acceptable 3D object quality produced by the electrophotographic method is reliant on managing the residual charge on the build object.

From a review of the literature and patents, it is clear that the build rate of digitally produced 3D objects based on the electrophotographic process is limited by a wait time associated with the transfer of each 2D layer to the build object. Heat is typically employed to render the 2D layer sufficiently tacky during a transfusion step that also uses pressure to adhere the layer to the build object. Furthermore, the build object can be either charged or neutralized with gaseous ions to improvement the quality of the build object. Whenever heating is used such as in the transfusion step, there is a wait time introduced in the process that depends on heating rates, thermal conductivities, heat capacities, and cooling rates. The productivity for digitally building a 3D object on a build platform with the electrophotographic process is compromised if the thermal wait time for applying another layer exceeds the time that it takes to produce a 2D layer by the electrophotographic process.

In summary, in the patents, published applications, and literature known to the Applicants that describe various methods including electrophotographic methods, for digitally fabricating 3D objects, such methods are limited to a single build platform architecture. If the lateral size of the 3D object is smaller than the build platform size, it is possible to produce multiple 3D objects on a single platform. However, the productivity for producing 3D objects is not substantially improved for 3D fabrication methods in which the layer formation is based on a single 2D scanning system. After a 3D object is fabricated on any single build platform using a particular process, the 3D object must either be removed from the build platform, or the build platform with the 3D object must be removed and replaced with another build platform for fabricating another 3D object of the same or different shape. Under such constraints, the rate for producing multiple 3D objects is undesirably slow when using an apparatus and process that is limited to a single build platform.

Accordingly, there remains a need for a high build rate method and apparatus, which can build a three-dimensional part.

SUMMARY

It is the purpose of the present disclosure to describe a method for improving the productivity of digitally fabricated multiple 3D objects of the same or different shape and material composition. The improved productivity is obtained by incorporating multiple build platforms within the 3D manufacturing apparatus. In one aspect of the present disclosure, variants of the electrophotographic process may be used for producing 3D objects. For such 3D manufacturing processes based on electrophotography, a wait time is typically required before another layer can be applied on top of the build object. This wait time can substantially reduce the build rate, particularly for those manufacturing processes in which the deposition time for a layer is rather short. With multiple build platforms, a layer can be rapidly applied to one build object after another as long as the time between layer depositions for a particular object is greater than the wait time required before deposition of the next layer in the case of when only a single platform is utilized. The time for when another layer is applied to a particular build object depends on the process speed and the number of build platforms in the system. Thus, the overall productivity for manufacturing many objects by the use of multiple build platforms is substantially improved over the production of the same number of 3D objects with a manufacturing process based on a single platform.

A number of architectures are envisioned for providing multiple platforms for digitally fabricating 3D objects. For planar build platforms, the multiple platforms can be shuttled back and forth in linear translations, or incorporated in a circulating racetrack configuration. If the build platforms are in the shape of an arc segment of a right circular cylinder, such multiple build platforms can be attached to the surface of a rotating cylindrical drum of nominally the same radius of curvature as the platforms. Regardless of the particular configuration of multiple platforms, a duplicate set of multiple platforms can also be configured adjacent to the other set. When a complete set of multiple objects is produced, the adjacent set of multiple platforms can be automatically moved to the build station to continuously fabricate 3D objects on a new set of multiple platforms. While the new set of objects is being produced, the previous completed set of objects can be removed and new build platforms installed. Thus, the 3D object build rate, and consequently overall productivity, is substantially improved through the utilization of two sets of adjacent multiple platforms that essentially enable continuous deposition of layers for the fabrication of 3D objects of similar or different shapes.

In accordance with the present disclosure, a method of fabricating a plurality of objects using multiple build platforms is provided. The method comprises depositing a first powder layer on a surface of a first object substrate on a first build platform located at a material transfer station; consolidating the first powder layer on the first object substrate to form a first solid layer of a first object on the first object substrate; locating a second object substrate on a second build platform at the material transfer station following removal of the first build platform with the first object substrate from the material transfer station; depositing a first powder layer on the surface of the second object substrate; consolidating the first powder layer on the second object substrate to form a first solid layer of a second object on the second object substrate; and removing the second build platform with the second object substrate from the material transfer station.

In certain embodiments, consolidating the first powder layer into a solid layer of the first object on the first object substrate may be performed after removing the first build platform with the first object substrate from the material transfer station. In like manner, consolidating the first powder layer on the second object substrate to form the first solid layer of the second object on the second object substrate may be performed after removing the second build platform with the second object substrate from the material transfer station. Consolidating a powder layer on an object substrate, or on previously consolidated layers on the substrate may be performed by applying at least one of heat and pressure to the powder layer.

In other embodiments, consolidating the first powder layer on the first object substrate to form the first solid layer of the first object on the first object substrate and consolidating the first powder layer on the second object substrate to form the first solid layer of the second object on the second object may be performed at the material transfer station. Consolidating the first powder layer on the first object substrate may be performed during depositing the first powder layer on the surface of the first object substrate, and consolidating the first powder layer on the second object substrate may be performed during depositing the first powder layer on the surface of the second object substrate. Alternatively, consolidating the first powder layer on the first object substrate and consolidating the first powder layer on the second object substrate may be performed after depositing the first powder layer on the surface of the first object substrate and depositing the first powder layer on the surface of the second object substrate. The method may further include pre-conditioning the first solid layer of the first object on the first object substrate and the first solid layer of the second object on the second object substrate.

In certain embodiments, the method may further comprise first depositing the first powder layer deposited on the surface of the first object substrate on a surface of an intermediate substrate, moving that first powder layer on the surface of the first intermediate substrate to the first build platform located at the material transfer station prior to depositing the first powder layer on the surface of the first object substrate; and depositing the first powder layer deposited on the surface of the second object substrate on the surface of the intermediate substrate, moving that first powder layer on the surface of the intermediate substrate to the second build platform located at the material transfer station prior to depositing that first powder layer on the surface of the second object substrate. The intermediate substrate may be a belt substrate or a drum substrate. The depositing of powder layers on the surface of the intermediate substrate may be performed by an electrophotographic process. In certain embodiments, the intermediate substrate may be a belt substrate. In other embodiments, the intermediate substrate may be a drum substrate.

The method may further comprise pre-conditioning the powder layers on the surface of the intermediate substrate prior to depositing the respective powder layers on the respective surfaces of the object substrates, or the consolidated layers adhered thereto. The method may further comprise post-conditioning the respective first solid layers or consolidated solid layers on the respective object substrates.

In instances in which the objects are comprised of two layers, the method further comprises moving the first build platform with the first object substrate and first solid layer of the first object to the material transfer station; depositing a second powder layer on the first solid layer of the first object; consolidating the second powder layer with the first solid layer of the first object; locating the second build platform with the second object substrate and first solid layer of the second object at the material transfer station following removal of the first build platform with the first object substrate from the material transfer station; depositing a second powder layer on the first solid layer of the second object; consolidating the second powder layer with the first solid layer of the second object; and removing the second build platform with the second object substrate from the material transfer station.

Objects comprised of many more layers may be fabricated. Stated generally, for first and second objects comprised of h consolidated layers, after the consolidation of the first two layers of the first and second objects, the method comprises repeating the following steps h−2 times: moving the first build platform with the first object substrate and consolidated solid layers of the first object to the material transfer station; depositing an additional powder layer on the consolidated solid layers of the first object; consolidating the additional powder layer with the consolidated solid layers of the first object; locating the second build platform with the second object substrate and consolidated solid layers of the second object at the material transfer station following removal of the first build platform with the first object substrate and consolidated solid layers of the first object from the material transfer station; depositing an additional powder layer on the consolidated solid layers of the second object; consolidating the additional powder layer with the consolidated solid layers of the second object; and removing the second build platform with the second object substrate from the material transfer station.

In certain embodiments, the moving of the build platforms to and from the material transfer station may be performed using linear pathways. In other embodiments, the moving of the build platforms may be performed using cyclic loop pathways. The cyclic loop pathways may be rectangular or elliptical pathways, or "racetrack" shaped having linear elongated sides and circular ends. In embodiments in which the build platforms are joined to a cylinder, the cyclic loop pathways are circular.

The method may be used to fabricate more than two objects. Stated generally, in the fabrication of each additional object, for the addition of another layer, the method comprises selecting a chosen build platform from the set of build platforms that are holding the objects, and moving the chosen build platform with object substrate and consolidated solid layers of the object on the chosen build platform to the material transfer station; depositing an additional powder layer on a surface of the object substrate on the consolidated solid layers of the object on the chosen build platform; consolidating the additional powder layer with the consolidated solid layers of the object on the chosen build platform; and removing the chosen build platform from the material transfer station. For each additional object, the powder layer depositions and consolidations may be repeated as described above to fabricate the objects with multiple layers.

In certain embodiments of methods for fabricating more than two objects, the build platforms may be divided into two or more groups that are movable by conveyors that are adjacent to each other. Such embodiments are advantageous in that the cycle time for fabricating an object is reduced, as will be described subsequently. In one such embodiment, the method further comprises providing a third build platform and a fourth build platform adjacent to the first build platform and the second build platform, the third and fourth build platforms movable relative to the material transfer station along a second cyclic loop pathway; disposing a third object substrate on the third build platform; disposing a fourth object substrate on the fourth build platform; moving the first build platform and first object substrate and first solid layer of the first object and the second build platform and second object substrate and first solid layer of the second object relative to the material transfer station to a distal location wherein the first cyclic loop pathway is not in communication with the material transfer station; moving the third build platform and third object substrate and the fourth build platform and fourth substrate relative to the material transfer station to a proximal location wherein the second loop pathway is in communication with the material transfer station; locating the third build platform and third object substrate at the material transfer station, depositing a first powder layer on the surface of the third object substrate and consolidating the first powder layer on the third object substrate to form a first solid layer of the third object on the third object substrate; and locating the fourth build platform and fourth object substrate at the material transfer station following removal of the third build platform with the third object substrate from the material transfer station, depositing a first powder layer on the surface of the fourth object substrate and consolidating the first powder layer on the fourth object substrate to form a first solid layer of the fourth object on the fourth object substrate. The second cyclic loop pathway may be in a direction that is opposite to the direction of the first cyclic loop pathway.

In certain embodiments, the first and second build platforms may be joined to an outer surface of a cylinder having an axis of rotation equidistant from all points on the outer surface. The first and second build platforms follow a loop pathway that is circular. In such embodiments, the method further comprises rotating the cylinder about its axis of rotation to cause the locating of the first build platform, first object substrate and first powder layer of the first object at the material transfer station, and to cause the removal of the first build platform with the first object substrate and first solid layer of the first object from the material transfer station, and to cause the locating of the second build platform, second object substrate and first powder layer of the second object at the material transfer station, and to cause the removal of the second build platform with the second object substrate and first solid layer of the second object from the material transfer station.

In certain embodiments for fabricating more than two objects, wherein n build platforms are joined to the surface of the cylinder, the method further comprises: for each of the n−2 additional object build platforms, rotating the cylinder about its axis of rotation to cause the locating of the build platform, the object substrate and the powder layer of the object on that build platform at the material transfer station; consolidating the powder layer on the object substrate to form a first solid layer of the object on the object substrate on that build platform; and rotating the cylinder about its axis of rotation to cause the removal of that build platform with the object substrate and solid layer of the object on that build platform from the material transfer station.

In accordance with the present disclosure, an apparatus for making a plurality of objects is also provided. The apparatus comprises a plurality of object substrates, each of the substrates comprising a powder receiving surface; a plurality of build platforms, each of the build platforms engageable with any one of the object substrates; a material transfer station comprised of a fixture engageable with any one of the build platforms; a transporting device engaged with each of the build platforms and operable to repeatedly transport each of the build platforms to and from the material transfer station; and a powder layering device operable to dispense a layer of powder onto one of the powder receiving surface or a consolidated layer of powder on the powder receiving surface of any one of the object substrates when that object substrate is located at the material transfer station.

In certain embodiments, the powder layering device may be comprised of a powder layer generating device operable to dispense a powder layer onto a powder layer transfer device comprising a transfer substrate having a surface movable between the powder layer generating device and the material transfer station. The powder layer transfer device substrate may be a belt substrate or a drum substrate. The powder layer generating device may be an electrophotographic imaging engine. In certain embodiments, the transporting device transports the build platforms to and from the material transfer station in linear pathways.

In other embodiments, the transporting device transports the build platforms to and from the material transfer station in cyclic loop pathways. In one such embodiment, the transporting device of the apparatus is comprised of a first conveyor engaged with a first portion of the build platforms and operable to transport the first portion of the build platforms to and from the material transfer station in a first cyclic loop pathway; and a second conveyor adjacent to the first conveyor and engaged with a second portion of the build platforms and operable to transport the second portion of the build platforms to and from the material transfer station in a second cyclic loop pathway. In another embodiment, the transporting device of the apparatus is a cylinder comprising an outer surface and having an axis of rotation equidistant from all points on the outer surface, and each of the build platforms are joined to the outer surface of the cylinder, and wherein the cylinder is rotatable around its axis of rotation to transport each of the build platforms to and from the material transfer station.

In a further embodiment, multiple cylinders may be used to transport the build platforms, each cylinder transporting a portion of the build platforms joined thereto. In one such embodiment, the transporting device of the apparatus is comprised of a first cylinder and a second cylinder, each of the first and second cylinders comprising an outer surface and having an axis of rotation equidistant from all points on the outer surface of that cylinder. A first portion of the build platforms are joined to the outer surface of the first cylinder, and the first cylinder is movable to a location proximate to the material transfer station and rotatable around its axis of rotation to transport each of the build platforms of the first portion of the build platforms to and from the material transfer station. A second portion of the second cylinder is movable to the location proximate to the material transfer station and rotatable around its axis of rotation to transport each of the build platforms of the second portion of the build platforms to and from the material transfer station.

The use of multiple conveyors or multiple cylinders, each moving a portion of the build platforms, is advantageous because it reduces the cycle time to fabricate an object, as will be explained subsequently.

BRIEF DESCRIPTION OF THE DRAWINGS

The present disclosure will be provided with reference to the following drawings, in which like numerals refer to like elements, and in which:

FIGS. 3A, 3B, and 3C are schematic plan views of an apparatus for fabricating 3D objects comprised of multiple planar build platforms being continuously translated past a layer deposition apparatus, and optionally, one or more conditioning stations;

DETAILED DESCRIPTION

Figure 1:
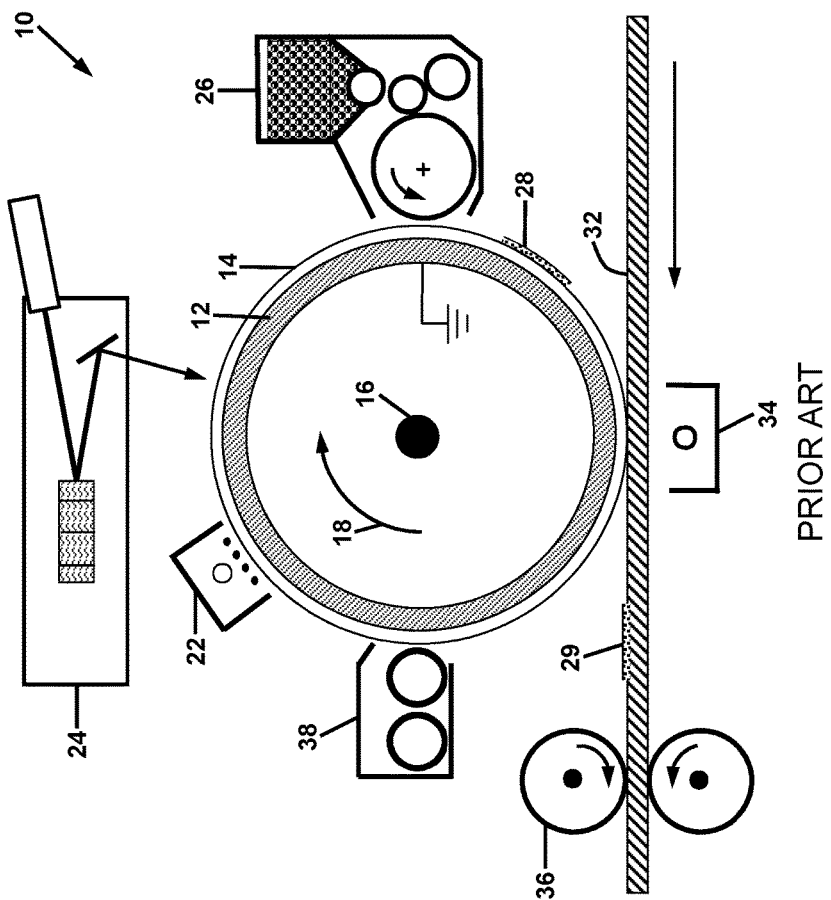
FIG. 1 is a schematic illustration of a conventional electrophotographic printer.

For a general understanding of the present invention, reference is made to the drawings. In the drawings, like reference numerals have been used throughout to designate identical elements. It is to be understood that the overall scale of the drawings and the relative sizes of particular features are as shown for the sake of clarity of illustration, and may vary from that shown. Additionally, this disclosure may identify certain components with adjectives such as "top," "upper," "bottom," "lower," "left," "right," etc. These adjectives are provided in the context of the orientation of the drawings, which is not to be construed as limiting the apparatus disclosed herein to use in a particular spatial orientation.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

To fully illustrate the benefit of utilizing multiple build platforms for improving the productivity of digitally fabricated 3D objects, a detailed description of certain preferred embodiments is provided in connection with 3D manufacturing processes based on electrophotography. This emphasis on electrophotographic processes should not be interpreted to limit the utility of multiple build platforms as being operable with only electrophotographic processes. Rather, multiple build platforms can improve productivity for a number of other 3D manufacturing processes for which a post layer conditioning time is comparable to or greater than the layer deposition time. The emphasis on electrophotographic processes is due to the fact that the electrophotography printing process can produce 2D powder layers of the size of paper documents (21 cm by 28 cm) at rates up to approximately 180 prints per minute. This is equivalent to a rate of about one layer every ⅓ of a second. If each powder layer is approximately 25 μm thick, at this rate a 7.5 cm high 3D object can be fabricated in an hour. Accordingly, while the combination of an electrophotographic process with multiple build platforms is one preferred embodiment of an apparatus for and a method of making a three-dimensional object, other additive manufacturing processes may also be used with multiple build platforms to perform the 3D object fabrication, such as those additive manufacturing processes that require coating a powder layer on the 3D object and support material before the next layer is subjected to ink jet or laser scanning.

For the purposes of understanding certain electrophotographic embodiments of the apparatus and methods of the present disclosure, a summary of the electrophotographic process will first be presented. Referring to FIG. 1, system 10 is a schematic illustration of a conventional electrophotographic printer for producing black and white prints on a typical medium such as paper. The printer contains a number of sub-systems configured around a rotating grounded and conductive drum 12 overcoated with photoconductive material 14. The shaft 16 is connected to a drive motor (not shown) for rotation of the drum 12 in the direction of the arrow 18. The photoconductive material 14 may be provided from a variety of materials such as amorphous selenium and alloys, zinc oxide either alone or in combination with organic materials, or organic materials alone that provide photoinduced charge generation and transport. The photoconductive material 14 is uniformly charged with a corona device 22 and then exposed to light from a laser raster output scanner 24 comprised of a modulated laser beam reflected off a rotating polygon mirror. Alternatively, a LED image bar may be used to produce an electrostatic latent image on the photoconductor. A development system 26 containing typically insulative powder referred to as toner is charged by triboelectricity in either single component (illustrated in FIG. 1) or two-component (mixture of toner with larger magnetic carrier beads) development systems. The triboelectrically charged toner is used to develop either charged or discharged areas of the electrostatic image on the photoconductor; according to the charge polarity of the toner. The toned region 28 of the photoconductor 14 is the region between approximately the 3 o'clock and the 6 o'clock positions of the photoconductor 14 in FIG. 1. A medium 32 such as paper is fed between the toned photoconductor 14 and a corona ion transfer device 34. The polarity of the ion charge applied to the medium 32 by the corona ion transfer device 34 is opposite to that of the toner charge so that there is an electrostatic attraction of the toner 28 to the medium 32. The toned medium passes through a fusing system 36 that binds the toner 29 to the medium 32 by heat and pressure. Any residual toner (not shown) on the photoconductor that was not transferred to the medium 32 is removed by a cleaning system 38 before repeating the printing cycle.

Figure 2:
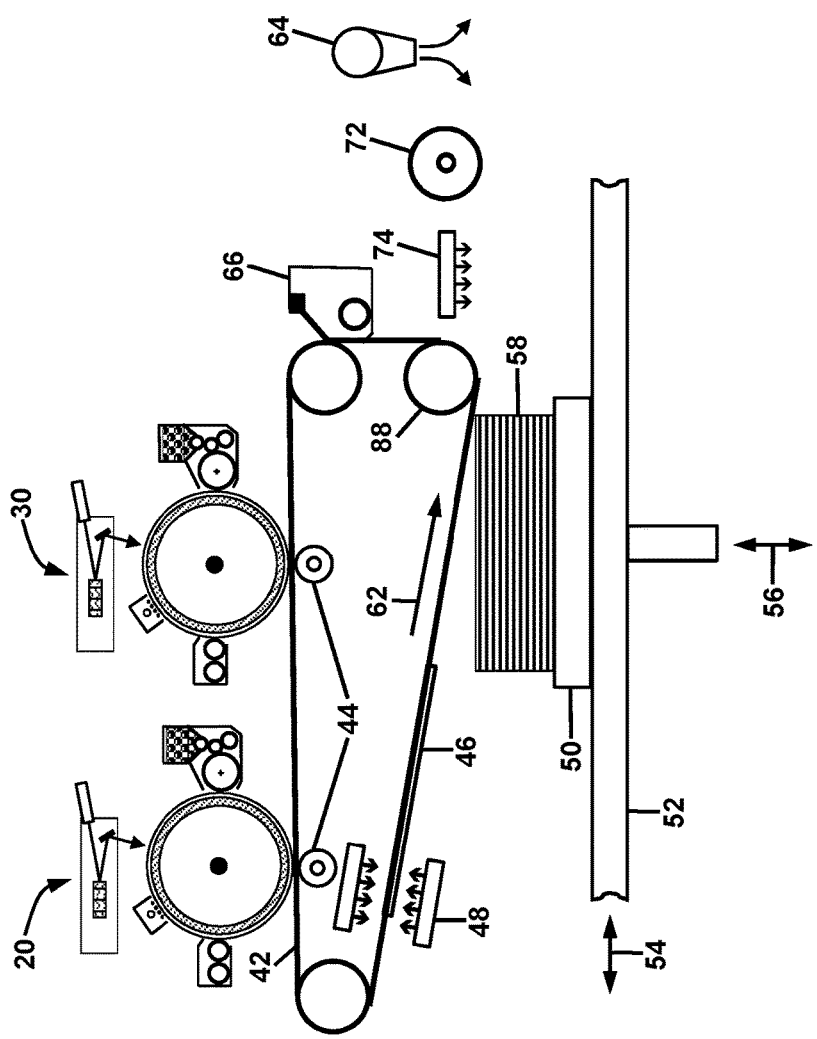
FIG. 2 is a schematic illustration of two electrophotographic printers for depositing different powder layers onto a belt medium for transfer onto a 3D object on a moveable planar build platform that enables post-transfer conditioning.
Figure 4:
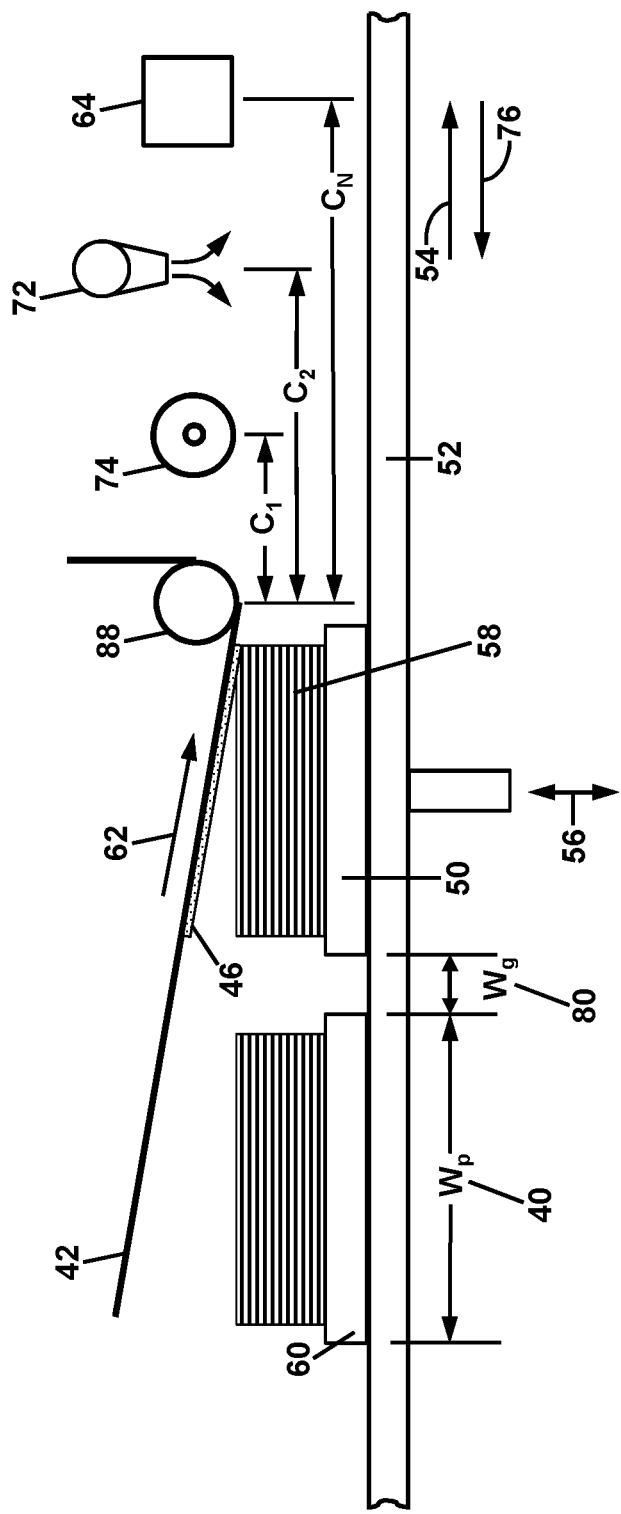
FIG. 4 is a schematic illustration for transferring layers to one or more 3D object build platforms, followed by one or more stations for conditioning the layers.

FIG. 2 illustrates an architecture for digitally fabricating 3D objects with the electrophotographic process. FIG. 2 depicts two electrophotographic print engines, 20 and 30, for providing triboelectric charged powder images for the 3D object and support materials, for example. The images of charged powder are electrostatically transferred to an intermediate transfer belt 42 with the aid of electrically biased transfer rollers 44. The powder layer 46 can be quickly transferred to the build object 58. Under these circumstances, a synchronous roller contact 88 between the powder layer 46 on the transfer belt 42 and the translating build object 58 is sufficient to enable the layer transfer. The build platform 50 is attached to a moving carriage or conveyor 52 that can be translated back and forth in the process direction 54, as well as the vertical direction 56 through the use of motors and drive apparatus. FIG. 2 illustrates the possibility of using pre-transfer heating 48 and post-transfer conditioning with the energy source 74, layer consolidation 72 by heat and pressure, and a cooling device 64.

Although not shown in FIG. 2, it may also be desirable to use one or more stations for pre-conditioning the build object 58 immediately before powder layer 46 is transferred to the build object 58 at a material transfer station such as that formed by a synchronous roller contact 88 between the powder layer 46 on the transfer belt 42 and the translating build object 58. One example of a pre-conditioning station is a means for applying an adhesive to the build object 58 to facilitate the transfer of the powder layer 46 to the build object.

As described previously herein, the patents, published patent applications, and literature describing various methods for digitally fabricating 3D objects are limited to those having a single build platform architecture. In contrast, in accordance with the present disclosure, methods and apparatus are provided that incorporate multiple build platforms for improved 3D fabrication productivity. Such methods and apparatus will now be described with reference to FIGS. 3A-9.

First, with regard to terms used in the following disclosure, the term "build platform" is meant to indicate a base or substrate that receives sequentially deposited layers of material that form a three-dimensional object. A first layer is deposited directly onto the substrate, a second layer is deposited onto the first layer, and so forth with subsequent layers deposited in sequence so as to build the three-dimensional object layer by layer upon the build platform. The layer deposition apparatus, and/or any layer conditioning apparatus that operates immediately before or after layer deposition, may include a layer transfusing apparatus, such as a heated pressure roller transfuse apparatus, or other conditioning apparatus such as those described subsequently herein.

When the layer depositions are completed to form the 3D object, the object is separated from the build platform. In certain embodiments, the build platform may have a planar surface for receiving the layers of material. The surface of the build platform that receives the layers of material will preferably have only a moderate degree of adhesion to the material being deposited. The adhesion will be sufficient to enable the build platform to be moved during layer depositing operations without the object becoming detached from the platform, but low enough so that the object can easily be separated from the build platform when the object is complete.

As described previously, the process by which the layers are deposited may include electrophotographic processes such as the process described previously with reference to FIGS. 1 and 2, or other additive manufacturing processes such as selective laser sintering, ink jet binding and electron beam melting of powder layers. The deposited layers may include more than one material. For example, a layer or series of layers may include "build" material, which is a material that will be included in the final 3D object, and "support" material, which is a material that is temporarily placed in a layer so as to support subsequent build material that is deposited on top of it, and which will later be removed from the 3D object by dissolution, breaking away, or other suitable means.

FIGS. 3A-3C show schematic plan views in which a series of three-dimensional objects are fabricated using multiple build platforms arranged in a linear array. In reference to FIG. 3A, a layer of build and support material is transferred in zone 77 to the build object 58 on build platform 50. As the build platforms 50, 60, and 70 are linearly translated in the direction of arrow 84, the configuration shown in FIG. 3B is obtained whereby one or more post-transfer stations 82 are used to condition the transferred layer of object 58 on platform 50. At the same time, a layer of build and support material is transferred in zone 77 to the object 68 being built on build platform 60. Further linear advancements of the build platforms 50, 60, 70, and the 3$^{rd}$ through (n−1)th build platforms (not shown but indicated by sequential dots) occurs such that the 3$^{rd}$ through (n−1)th platforms receive layers from the layer deposition apparatus (not shown).

Upon yet further linear advancement of the build platforms 50, 60 and 70, the configuration shown in FIG. 3C is obtained whereby one or more post-transfer stations 82 are used to condition the transferred layer of object 68 on platform 60 and a layer of build and support material is transferred in zone 77 to the object 78 being built on build platform 70. It should be noted that the post-transfer stations for conditioning the transferred layer can include the steps of transfusing, heating, cooling, consolidating, UV curing, coating powder for the next layer, etc. It should further be noted that after a layer is transferred and conditioned on the nth build platform, the whole array of the n build platforms is stepped down and rapidly translated back in the direction of arrow 86 of FIG. 3C, in a time period referred to subsequently herein as the "fly back time". The height of the platforms is reset each time for repeatedly transferring the next set of layers.

In general, there can be n number of build platforms in a linear array as indicated in FIGS. 3A-3C. A practical number for n depends on the time required for conditioning a build object such as object 58 after the transfer step, in comparison to the transfer time. To quantitatively understand the build rate benefit of using a linear array of multiple platforms when post transfer conditioning is required or desired, it is informative to demonstrate the benefit with mathematical descriptions. Towards that end, FIG. 4 defines various parameters used in the calculations. Suppose that the width 40 of a build platform in the process direction is $W_p$, the gap 80 between build platforms is $W_g$ and the process speed 54 for layer transfer is $V_p$. The time to build a single layer on a single build platform, $T_{1p}$, is $$T_{1p} = \frac{W_p + W_g}{V_p}. \tag{1}$$

If conditioning of the transferred layer is desired before another layer can be transferred to the 3D object, extra time is required for moving the build platform 50 past various conditioning stations such as 74, 72 and 64. Assume that the distance of the m$^{th}$ conditioning station from the layer transfer zone is given by $C_m$, where m is equal to 1 to N with N corresponding to the conditioning station that is at the maximum distance from the transfer zone. The extra time for complete conditioning is determined by the distance $C_N$, which can also be expressed as the product of $f_N$ times $(W_p+W_g)$. It should also be noted that if one or more pre-transfer conditioning stations are used, the time for pre-transfer conditioning is likewise determined by the greatest distance between a pre-transfer conditioning station and the transfer zone. When both pre-transfer and post-transfer conditioning stations are used, $f_n$ is calculated according to the maximum difference in distance between any pre-transfer and post-transfer conditioning stations.

The time to build a single layer on a single build platform 50 with conditioning, $T_{1pc}$, is $$T_{1pc} = \frac{W_p + W_g}{V_p} + \frac{f_N(W_p + W_g)}{V_p} = \frac{W_p + W_g}{V_p}(1 + f_N). \tag{2}$$

The time to build a single layer on two build platforms 40 and 50 with conditioning, $T_{2pc}$, is $$T_{2pc} = \frac{W_p + W_g}{V_p}(2 + f_N). \tag{3}$$

The time to build a single layer on a linear array of n build platforms, $T_{npc}$, with conditioning is $$T_{npc} = \frac{W_p + W_g}{V_p}(n + f_N). \tag{4}$$

The average time to build a single layer on a single platform for a linear array of n platforms with conditioning, $aveT_{npc}$, is $$aveT_{npc} = \frac{W_p + W_g}{V_p}\left(1 + \frac{f_N}{n}\right). \tag{5}$$

After a single layer is applied and conditioned on a linear array of n multiple platforms at a process speed 54 of $V_p$, the array of n platforms is stepped down and returned to the beginning at a fly back speed 76 of $V_{fb}$. The fly back time for a linear array of n platforms, $T_{nfb}$, will equal the build time $T_{npc}$ from Eq. 4 times the ratio of $V_p$ to $V_{fb}$. Thus, the total time to build a single layer on a linear array of n platforms with conditioning and fly back, $T_n$, is $$T_n = \frac{W_p + W_g}{V_p}(n + f_N)\left(1 + \frac{V_p}{V_{fb}}\right). \tag{6}$$

The average time to build a single layer on a single platform for a linear array of n platforms with conditioning and fly back, $aveT_n$, is $$aveT_n = \frac{W_p + W_g}{V_p}\left(1 + \frac{f_N}{n}\right)\left(1 + \frac{V_p}{V_{fb}}\right). \quad (7)$$

Assume now that the 3D fabrication process uses electrophotography to produce the layers that are roller 88 transferred to the 3D build object at the layer transfer zone. The process speed 62 of electrophotography is typically in the range of 10 to 75 cm/s. For a process speed 54 of $V_p$=30 cm/s and platform plus gap width of $(W_p+W_g)$=15 cm, the time to build a single layer (without any conditioning or fly back time) on a single build platform, $T_{1p}$, from Eq. 1 is 0.5 seconds. If $f_N$ is 2 and the ratio of the fly back speed, $V_{fb}$, to process speed, $V_p$, is 3, then from Eq. 7 for n=1 the time to deposit one layer on a single platform is 2 seconds. For n=10, the average time to build a single layer on a single platform according to Eq. 7 is 0.8 seconds. In the limit of a large number of platforms, the average time to produce a single layer (with conditioning and fly back time) on a single platform approaches 0.67 seconds.

If the height of a transferred layer after conditioning is $H_l$ and from Eq. 7 the average time to produce a single layer on a single platform for a linear array of n platforms with conditioning and fly back is $aveT_n$, then the rate of building a 3D object, R, in units of height per unit time is $$R = \frac{H_l}{aveT_n} = \frac{H_l}{\frac{W_p + W_g}{V_p}\left(1 + \frac{f_N}{n}\right)\left(1 + \frac{V_p}{V_{fb}}\right)}. \quad (8)$$

To build a 3D object of height $H_o$, the 3D object average build time, $T_o$, is $$T_o = \frac{H_o}{R} = \frac{H_o}{H_l}\left[\frac{W_p + W_g}{V_p}\left(1 + \frac{f_N}{n}\right)\left(1 + \frac{V_p}{V_{fb}}\right)\right]. \quad (9)$$

If $f_N$ is 2, the ratio of the fly back speed, $V_{fb}$, to process speed, $V_p$, is 3 and $H_l$ is 25 μm, the time to build a 3D object to a height of 9 cm is 2 hours for a single platform corresponding to n=1. For n=10, the average time to build a 3D object to the same height of 9 cm is reduced to 48 minutes.

Figures 5A, 5B:
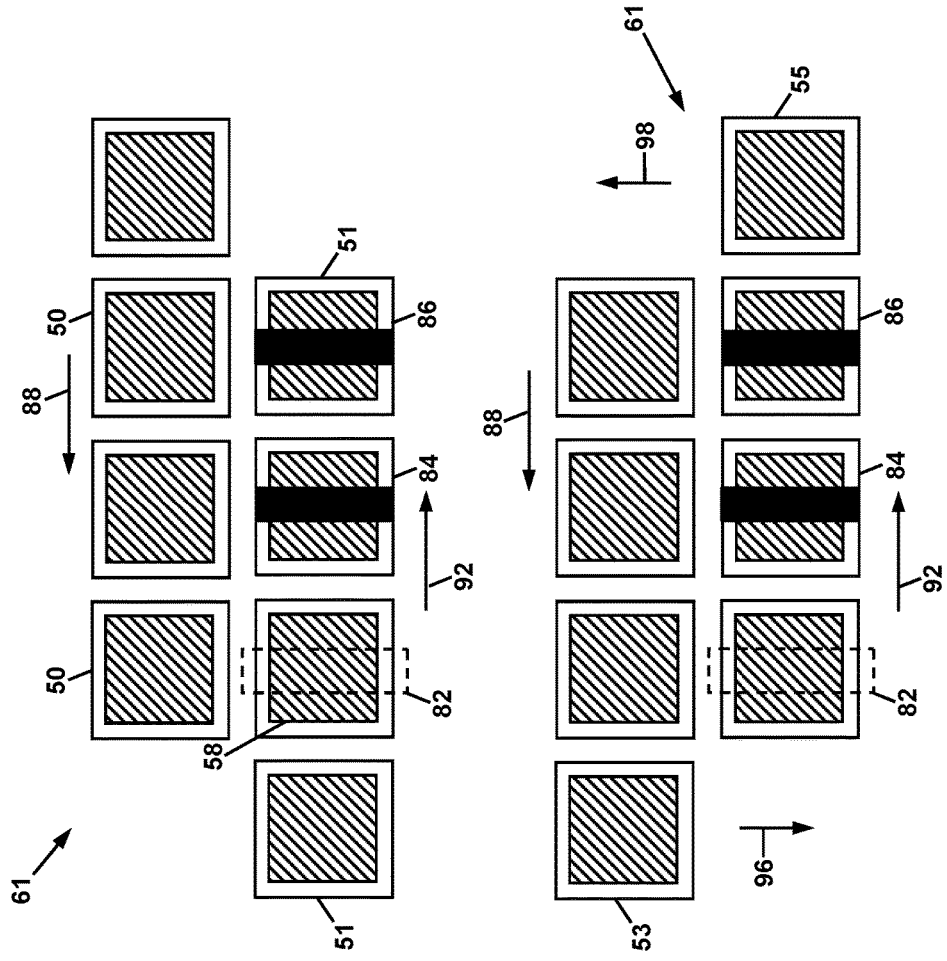
FIGS. 5A and 5B are schematic plan views of an apparatus for fabricating 3D objects comprised of multiple planar build platforms continuously translated past a layer deposition apparatus with a transfer station and, optionally, one or more conditioning stations in a "racetrack" configuration.

With a linear array of multiple build platforms for digitally fabricating 3D objects, a fly back time is required before the next set of layers can be transferred to the build objects. To obviate the need for a fly back time that decreases the rate of building a 3D object, the movement of a set of the multiple build platforms can be configured such that the multiple platforms are continuously circulated through the transfer station. One configuration for the continual circulation of multiple platforms 61 is illustrated in FIGS. 5A and 5B. In FIG. 5A, half of a set of build platforms 51 are moving in the direction of arrow 92 whereas simultaneously, the other half of build platforms 50 are moving in the opposite direction of arrow 88. The build platforms 50 and 51 may be moved by conveyors, such as conveyor 52 of the apparatus of FIG. 4.

A build or support layer is transferred to the build object 58 at transfer station 82. The transferred layers pass under different types of one or more conditioning stations such as 84 and 86. When each half set of respective build platforms 50 and 51 moving in opposite directions becomes positioned as shown in FIG. 5B, the respective leading build platforms 53 and 55 of each half set are switched to the other set as indicated by the directional arrows 96 and 98. The build platform switching reestablishes the configuration shown in FIG. 5A. Thus, the build platforms 50 and 51 continually circulate without essentially a pause until the fabrication of the 3D objects is completed. After each platform has received a layer, the support structure is incrementally lowered to accommodate the thickness of the next layer. It should be noted that although FIGS. 5A and 5B depict a particular architecture for circulating the build platforms, other architectures such as racetrack or carousel configurations are also feasible.

When multiple build platforms are continuously circulated through the transfer station as illustrated in FIGS. 5A and 5B, the need for a fly back time is obviated in comparison to a linear array of build platforms. With no fly back time, the average time to build a single layer on a single platform for a circulating set of n platforms with conditioning is given by Eq. 5.

Figure 6:
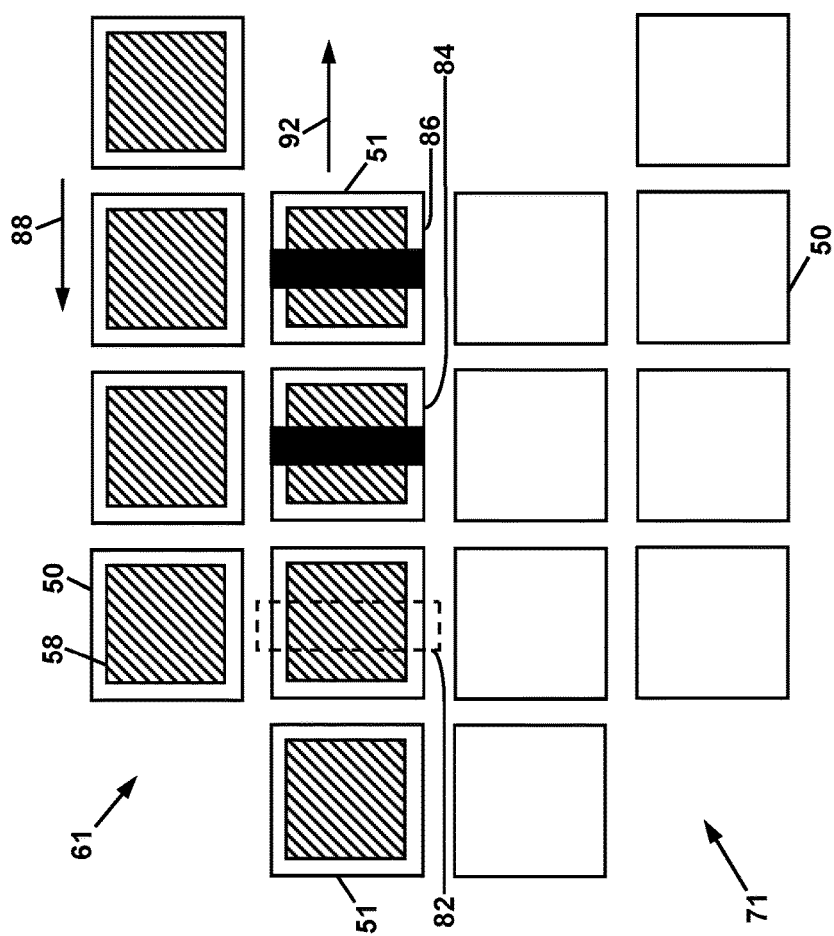
FIG. 6 is a schematic plan view of an apparatus for fabricating 3D objects, which illustrates in the upper half of the FIG. 6, multiple planar build platforms continuously translated past a layer deposition apparatus in a racetrack configuration, and in the lower half of the FIG. 6, a similar set of stationary multiple planar platforms adjacently positioned for rapid switching between the racetrack configurations relative to the layer deposition apparatus in order to provide virtually continuous 3D object building on multiple platforms.

When the fabrication of a set of 3D objects is completed on a set of build platforms as illustrated in FIGS. 5A and 5B, the fabrication system will need to be stopped so that the completed 3D objects and platforms can be removed and new build platforms installed. The need for a changeover time reduces the build productivity, and thus there is a further opportunity for improving throughput of the 3D object fabrication system. To reduce the impact of the changeover time on productivity, FIG. 6 shows two sets 61 and 71 of build platforms that are adjacent to each other and movable by conveyors (not shown). The 3D objects are fabricated on the circulating set 61 of build platforms on a first conveyor, while the set 71 of build platforms are idled in an adjacent position on a second conveyor. As illustrated in the apparatus 103 of FIG. 7, the multiple planar build platforms 61 and 71 have been shifted in the direction of 102 perpendicular to the process direction 88 so that the transfer station 82 and one or more conditioning stations such as 84 and 86 can begin to build 3D objects on the build platforms 71 while the completed 3D objects on build platforms 61 are removed and replaced with clean build platforms. It is noted that the multiple planar build platforms 61 and 71 are moved relative to the material transfer station 82, i.e., the build platforms 61 and 71 may be moved with the material transfer station 82 remaining fixed, or vice versa, or a combination of motion of both.

When fabrication of the set of 3D objects on build platforms 71 is completed, both sets of build platforms are translated in the direction of 107 perpendicular to the process direction 88 so that another set of 3D objects can be fabricated on set 61. The circulation of the completed set of 3D objects on circulating set 71 is now idled while the next set of objects on build platforms 61 is being fabricated. The idled set 71 enables removal of the completed 3D objects and the reloading of new build platforms. During 3D object fabrication, one set of build platforms rotates counterclockwise as illustrated by directional arrows 88 and 92 in FIG. 6 whereas the other set rotates clockwise as illustrated by directional arrows 94 and 104 in FIG. 7. When fabrication of any set of 3D objects is completed, both sets are translated back and forth to enable virtually continuous 3D object building.

Figure 7:
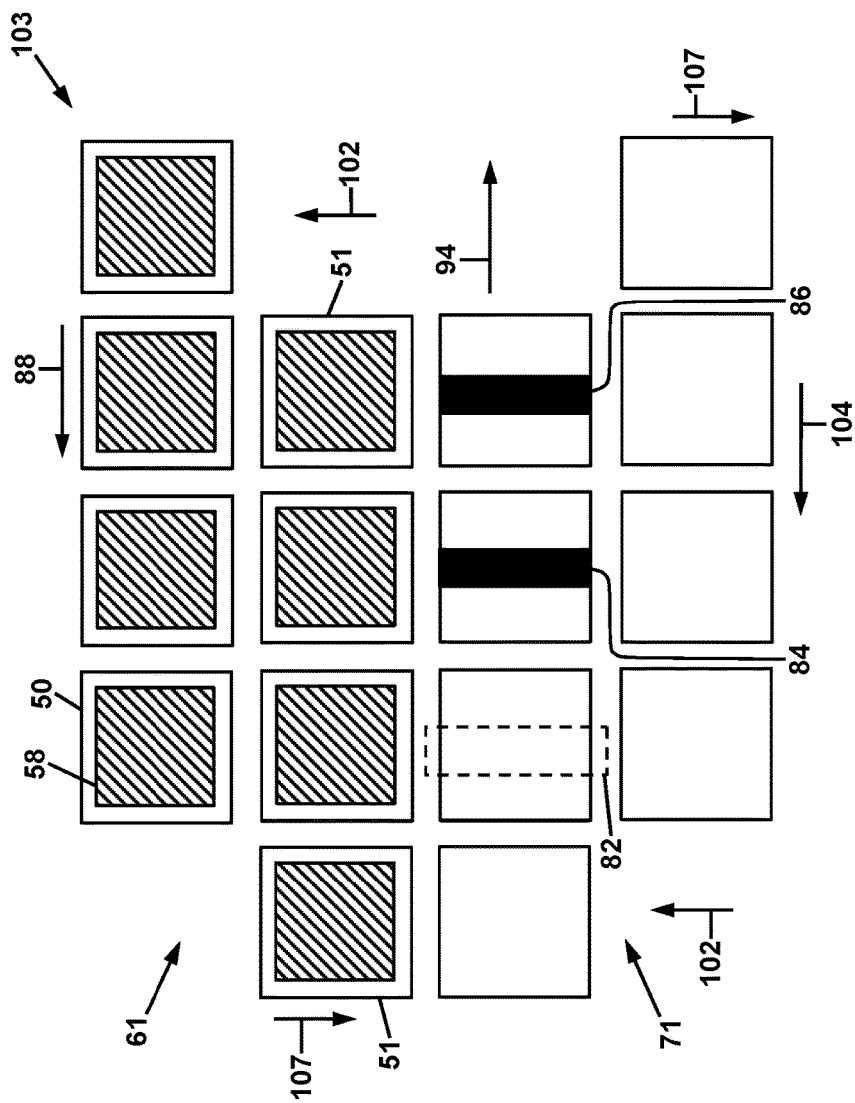
FIG. 7 is a schematic plan view of an apparatus for fabricating 3D objects similar to the apparatus of FIG. 6, except both the upper and lower halves of multiple planar build platforms have been shifted so that the layer deposition apparatus can begin to build 3D objects on the lower half while the completed 3D build objects on the upper half are removed and replaced with clean build platforms.

During the fabrication of objects on the set of build platforms 61, the build platforms 61 are moved along a first cyclic loop pathway that is in communication with the material transfer station 82 as illustrated in FIG. 6. As used in this instance, "in communication" means that the first cyclic loop pathway is proximal to the material transfer station 82 so that the build platforms 61 can each be moved to the material transfer station 82, and the powder layers upon each of them can be consolidated by the material transfer station 82. Subsequently, as illustrated in FIG. 7 the build platforms are moved "out of the way," i.e. to a position such that the first cyclic loop pathway is not in communication with the material transfer station 82; and the set of build platforms 71 is moved such that the second cyclic loop pathway of the build platforms 71 is in communication with the material transfer station 82. The build platforms 71 are then each moved to the material transfer station 82, and the powder layers upon each of them are consolidated by the material transfer station 82. The second cyclic loop pathway may be in a direction that is opposite the first loop pathway, as depicted in FIGS. 6 and 7.

Figure 8:
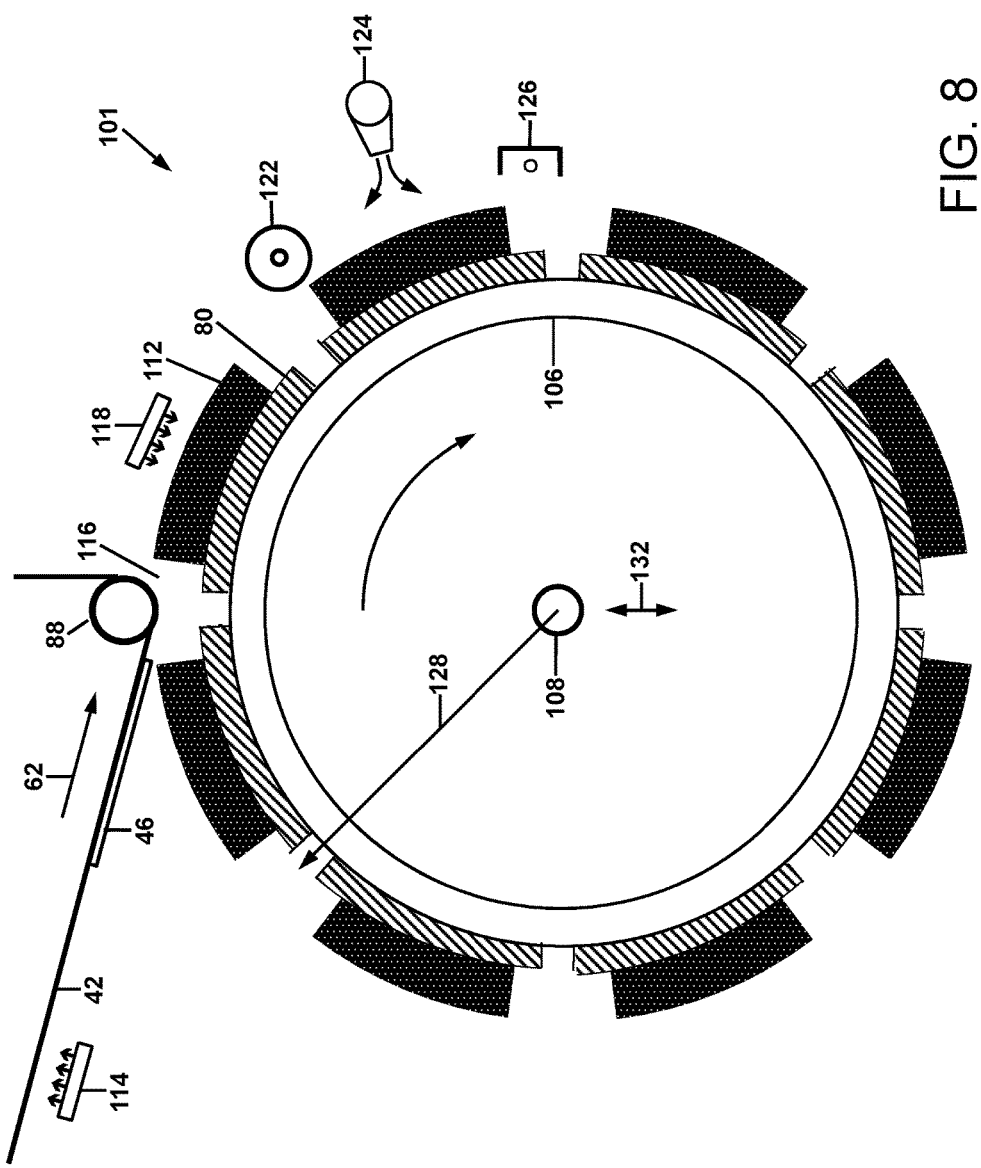
FIG. 8 is a schematic side view of an apparatus for fabricating 3D objects comprised of a rotating cylindrical drum fitted with multiple build platforms in the shape of an arc segment of a right circular cylinder, in which powder layers are sequentially roller transferred to the cylindrical build platforms.

In the digital fabrication of 3D objects, the object is typically fabricated on a planar build platform in a manner similar to electrophotographic printing on a planar sheet of paper as shown in FIG. 1 and described previously herein. Each layer of the build material represents a planar cross-section of the 3D object. This digital representation is appropriate for 3D objects with large cross-sectional areas. However, an alternative architecture for fabricating 3D objects with multiple platforms is feasible for 3D objects with small cross-sectional areas. FIG. 8 shows a schematic side view illustration of an apparatus 101 for fabricating 3D objects that is comprised of multiple build platforms that are non-planar and disposed on the outer wall of a cylindrical support drum 106 that rotates about a shaft 108. On the surface of the cylindrical drum 106, multiple build platforms 80 in the shape of an arc segment of a right circular cylinder are attached to the drum 106. Electrophotographic engines (not shown) produce powder layers 46 on transfer belt 42. The powder layer 46 can optionally be exposed to a heat source 114 prior to transfer to the build object 112 at the transfer zone 116 defined by the roller 88. The surface speed of the build object 112 is maintained synchronous with the speed of the transfer belt 42. Various desired post-transfer conditioning stations can be configured after the transfer zone 116. Examples of such stations include a heat or UV energy source 118, a compaction or fusing roll 122, a cooling source 124 and an ion charging source 126. After a complete revolution of drum 106, the rotating shaft 108 is incrementally lowered as indicated by arrow 132 to accommodate the thickness of the next layer to be transferred.

Figure 9:
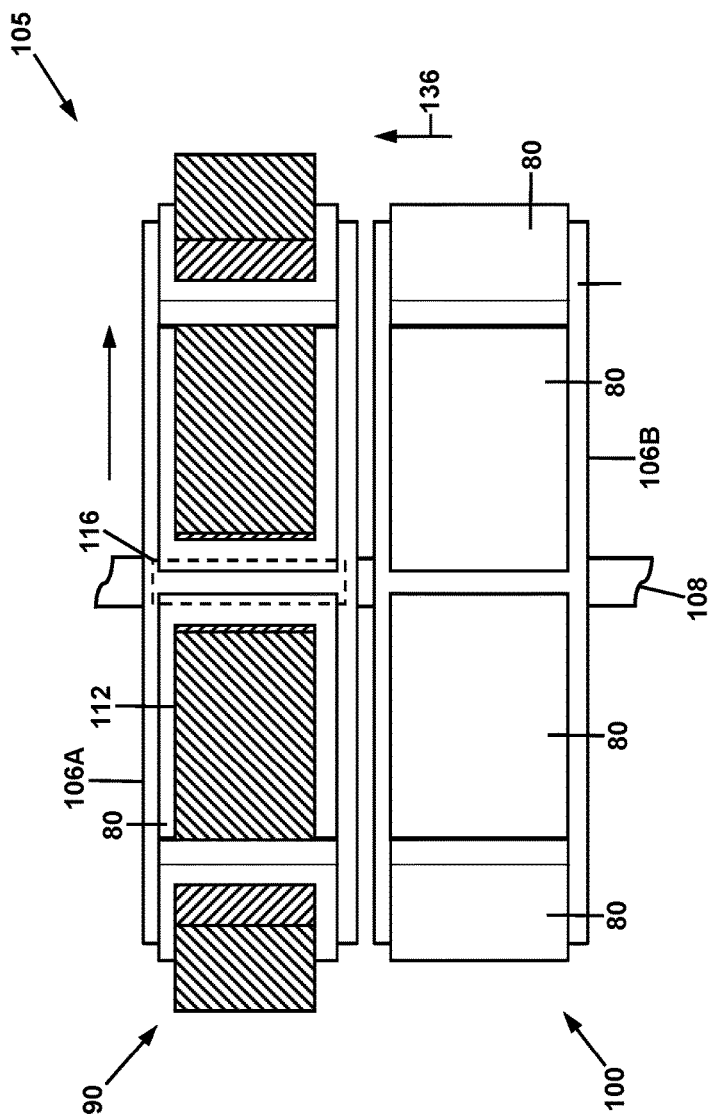
FIG. 9 is a schematic plan view of an apparatus for fabricating 3D objects comprised of two adjacent rotating cylindrical drums fitted with multiple build platforms in the shape of an arc segment of a right circular cylinder, wherein the adjacent drums can be shuttled back and forth under the roller transfer station when one drum has completed building the 3D objects.

When the fabrication of a set of 3D objects 112 is completed on a set of build platforms 80 on one drum 106 as illustrated in FIG. 8, the fabrication system 101 will need to be stopped so that the completed 3D objects 112 and platforms 80 can be removed and new cylindrical build platforms 80 installed. As described previously, the need for a changeover time reduces the 3D object build productivity. To reduce the impact of the changeover time on productivity, an apparatus for fabricating 3D objects is provided as shown in FIG. 9. The apparatus 105 is comprised of two adjacent cylindrical drums 106A and 106B with sets of cylindrical section build platforms 80 that are adjacent to each other. At the point in the process as depicted in FIG. 9, 3D objects are being fabricated on the rotating set 90 of build platforms 80 on a cylindrical drum 106A. Successive layers of build and support material are transferred to the build object 112 in the transfer zone 116. During fabrication of the 3D objects on rotating set 90, the set 100 of build platforms are idled in an adjacent position. When fabrication of the set 90 of 3D objects is completed, both sets are translated as indicated by arrow 136 in the axial direction so that another set of 3D objects can be fabricated on the set 100 of build platforms. The completed set 90 of 3D objects is now idled while the next set 100 of objects is being fabricated. The idled set 90 enables removal of the completed 3D objects and reloading of new build platforms. When fabrication of any set of 3D objects is completed, both sets are translated back and forth to enable virtually continuous 3D object building.

In using a cylindrical drum architecture for building 3D objects on multiple platforms as illustrated in FIGS. 8 and 9, it is necessary to use both object and support materials if the base of the 3D object to be fabricated is flat. If the flat base of the 3D object to be fabricated has a width of $W_b$ in the process direction and the radius 128 of the cylinder (See FIG. 8) defined by the outer surface of the cylindrical build platforms 80 is $R_c$, then the gap, G, between the outer edge of a flat base and the build platform is given by the formula, $$G = \sqrt{R_c^2 + (W_b/2)^2} - R_c. \tag{10}$$

For $W_b$=15 cm and $R_c$=30 cm, G=9.2 mm. For the same base width but a larger radius of $R_c$=60 cm, G=4.7 mm. It follows that at the outer edge of a flat base, the total thickness of the support material must be equal to or greater than G to be able to fabricate a flat base for a 3D object.

The 3D objects fabricated on a rotating drum must have sufficient cohesion and adhesion to the cylindrical section platform so as to not come off when the objects are oriented upside down during drum rotation. A centrifugal force also acts on the 3D object during drum rotation. It is of interest to compare the centrifugal force to the gravitational force. If the surface speed of the object is the speed 62 of the transfer belt $V_b$, then the centrifugal force, $F_c$, is given by the equation $$F_c = m \frac{V_b^2}{R_c}, \tag{11}$$

where m is the mass of the object. Since the gravitational force is mg where g=9.8 m/s$^2$ is the acceleration due to gravity, it is of interest to calculate the centrifugal acceleration in comparison to g for typical operating conditions. For $V_b$=30 cm/s and $R_c$=30 cm, the centrifugal acceleration is 0.3 m/s$^2$. For a typical operating surface speed and drum radius, the centrifugal force can be neglected.

When a set of multiple build platforms are configured with an adjacent set such that the platforms are continuously circulated through a transfer station as illustrated in FIGS. 6, 7 and 9, the rate of producing layers on the build object does not depend on the fly back time. Under these conditions, the rate for height per unit time, $R_c$, for continuously building a 3D object becomes $$R_c = \frac{H_l}{aveT_n} = \frac{H_l}{\frac{W_p + W_g}{V_p}\left(1 + \frac{f_N}{n}\right)}. \tag{12}$$

To build a 3D object of height $H_o$ under the continuous build conditions, the object average build time, $T_c$, is $$T_c = \frac{H_o}{R_c} = \frac{H_o}{H_l} \frac{W_p + W_g}{V_p}\left(1 + \frac{f_N}{n}\right). \tag{13}$$

If the width of the build platform, $W_b$, is decreased, then the rate of building 3D objects is increased according to Eq. 12. The time to build 3D objects is decreased according to Eq. 13. On the other hand, multiple 3D objects can be fabricated on a build platform of any practical size. Multiple objects, M, can be arrayed on a build platform in the process direction and/or perpendicular to the process direction. The rate for fabricating 3D objects, $R_N$, will be greater by a factor of M according to the equation $$R_M = M \frac{H_l}{aveT_n} = M \frac{H_l}{\frac{W_P + W_g}{V_p}\left(1 + \frac{f_N}{n}\right)}. \quad (14)$$

The time for fabricating a 3D object with M multiple objects per platform, $T_M$, is $$T_M = \frac{H_o}{R_m} = \frac{H_o}{M\,H_l} \frac{W_P + W_g}{V_p}\left(1 + \frac{f_N}{n}\right). \quad (15)$$

It is, therefore, apparent that there has been provided, in accordance with the present invention, a method for improving the productivity of digitally fabricating multiple 3D objects of the same or different shape. The improved productivity is obtained by incorporating multiple build platforms and multiple objects per platform within the 3D manufacturing apparatus. The productivity improvements are particularly significant for the 3D manufacturing process based on electrophotography.

Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly specified in the claims.

We claim:

1. A method of fabricating a plurality of objects, the method comprising:
    a) depositing a first dry solid phase powder layer on a first substrate surface of a first build platform located on a conveyor at a powder material transfer station;
    b) consolidating all of the deposited first dry solid phase powder layer on the first substrate surface to form a first solid layer of a first object on the first build platform;
    c) removing the first build platform with the first substrate surface from the powder material transfer station along a first cyclic loop pathway in communication with the powder material transfer station in a first loop direction:
    d) moving a second build platform located on the conveyor and including a second substrate surface to the powder material transfer station along the first cyclic loop pathway;
    e) depositing a first dry solid phase powder layer on the second substrate surface of the second build platform;
    f) consolidating all of the deposited first dry solid phase powder layer on the second substrate surface to form a first solid layer of a second object on the second build platform;
    g) removing the second build platform with the second substrate surface from the powder material transfer station along the first cyclic loop pathway;
    h) moving the first build platform with the first substrate surface and first solid layer of the first object to the powder material transfer station along the first cyclic loop pathway;
    i) depositing a second dry solid phase powder layer on the first solid layer of the first object;
    j) consolidating the second dry solid phase powder layer with the first solid layer of the first object;
    k) removing the first build platform with the first substrate surface and first and second solid layers of the first object from the powder material transfer station along the first cyclic loop pathway;
    l) moving the second build platform with the second substrate surface and first solid layer of the second object to the powder material transfer station along the first cyclic loop pathway;
    m) depositing a second dry solid phase powder layer on the first solid layer of the second object;
    n) consolidating the second dry solid phase powder layer deposited on the first solid layer of the second object with the first solid layer of the second object;
    o) removing the second build platform with the second substrate surface and first and second solid layers of the second object from the powder material transfer station along the first cyclic loop pathway;
    p) moving the first build platform and first substrate surface and first solid layer of the first object and the second build platform and second substrate surface and first solid layer of the second object relative to the powder material transfer station to a distal location wherein the first cyclic loop pathway is not in communication with the powder material transfer station;
    q) moving a third build platform including a third substrate surface and moving a fourth build platform including a fourth substrate surface relative to the powder material transfer station to a proximal location wherein a second cyclic loop pathway is in communication with the powder material transfer station, the third and fourth build platforms movable relative to the powder material transfer station along a second cyclic loop pathway;
    r) moving the third build platform and third substrate surface to the powder material transfer station along the second cyclic loop pathway, depositing a first dry solid phase powder layer on the third substrate surface and consolidating the first powder layer on the third substrate surface to form a first solid layer of the third object on the third substrate surface;
    s) removing the third build platform with the third substrate surface and first solid layer of the third object from the powder material transfer station along the second cyclic loop pathway; and
    t) moving the fourth build platform and fourth substrate surface to the powder material transfer station along the second cyclic loop pathway, depositing a first dry solid phase powder layer on the fourth substrate surface and consolidating the first dry solid phase powder layer on the fourth substrate surface to form a first solid layer of the fourth object on the fourth substrate surface.

2. The method of claim 1, wherein consolidating all of the first dry solid phase powder layer on the first substrate surface to form the first solid layer of the first object is performed after the step of removing the first build platform with the first substrate surface from the powder material transfer station, and consolidating all of the first dry solid phase powder layer on the second substrate surface to form the first solid layer of the second object is performed after the step of removing the second build platform with the second substrate surface from the powder material transfer station.

3. The method of claim 1, wherein consolidating all of the first dry solid phase powder layer on the first substrate surface to form the first solid layer of the first object and consolidating all of the first dry solid phase powder layer on the second substrate surface to form the first solid layer of the second object are performed at the powder material transfer station.

4. The method of claim 3, wherein consolidating all of the first dry solid phase powder layer on the first substrate surface is performed during depositing the first dry solid phase powder layer on the first substrate surface, and consolidating all of the first dry solid phase powder layer on the second substrate surface is performed during depositing the first dry solid phase powder layer on the second substrate surface.

5. The method of claim 1, wherein consolidating all of the deposited first dry solid phase powder layer on the first substrate surface and consolidating all of the deposited first dry solid phase powder layer on the second substrate surface are performed after depositing the first dry solid phase powder layer on the first substrate surface and depositing the first dry solid phase powder layer on the second substrate surface, respectively.

6. The method of claim 1, further comprising first depositing the first dry solid phase powder layer deposited on the first substrate surface on a surface of an intermediate substrate, moving that first dry solid phase powder layer on the surface of the first intermediate substrate to the first build platform located at the powder material transfer station prior to depositing that first dry solid phase powder layer on the first substrate surface; and first depositing the first dry solid phase powder layer deposited on the second substrate surface on the surface of the intermediate substrate, moving that first dry solid phase powder layer on the surface of the intermediate substrate to the second build platform located at the powder material transfer station prior to depositing that first dry solid phase powder layer on the second substrate surface.

7. The method of claim 6, wherein the intermediate substrate is a belt substrate.

8. The method of claim 6, wherein the intermediate substrate is a drum substrate.

9. The method of claim 6, wherein the first dry solid phase powder layer deposited on the first substrate surface and the first dry solid phase powder layer deposited on the second substrate surface are first deposited on the surface of the intermediate substrate by an electrophotographic process.

10. The method of claim 6, further comprising pre-conditioning, on the surface of the intermediate substrate, the first dry solid phase powder layer deposited on the first substrate surface and the first dry solid phase powder layer deposited on the second substrate surface prior to depositing the first dry solid phase powder layer on the first substrate surface and depositing the first dry solid phase powder layer on the second substrate surface, respectively.

11. The method of claim 1, further comprising post-conditioning the first solid layer of the first object on the first substrate surface and the first solid layer of the second object on the second substrate surface.

12. The method of claim 1, further comprising pre-conditioning the first solid layer of the first object on the first substrate surface and the first solid layer of the second object on the second substrate surface.

13. The method of claim 1, wherein the first object and second object are each comprised of h consolidated layers, the method further comprising repeating h—2 times:
   a) moving the first build platform with the first substrate surface and consolidated solid layers of the first object to the powder material transfer station;
   b) depositing an additional dry solid phase powder layer on the consolidated solid layers of the first object;
   c) consolidating the additional powder layer with the consolidated solid layers of the first object;
   d) removing the first build platform with the first substrate surface and consolidated solid layers of the first object from the powder material transfer station;
   e) moving the second build platform with the second substrate surface and consolidated solid layers of the second object to the powder material transfer station;
   f) depositing an additional dry solid phase powder layer on the consolidated solid layers of the second object;
   g) consolidating the additional powder layer with the consolidated solid layers of the second object; and
   h) removing the second build platform with the second substrate surface and consolidated solid layers of the second object from the powder material transfer station.

14. The method of claim 1, wherein the second cyclic loop pathway is in a second loop direction that is opposite the first loop direction.

15. A method of fabricating a plurality of objects, the method comprising:
   a) depositing a first dry solid phase powder layer on a first substrate surface of a first build platform located on a conveyor at a powder material transfer station:
   b) consolidating all of the deposited first dry solid phase powder layer on the first substrate surface to form a first solid layer of a first object on the first build platform;
   c) removing the first build platform with the first substrate surface from the powder material transfer station;
   d) moving a second build platform located on the conveyor and including a second substrate surface to the powder material transfer station;
   e) depositing a first dry solid phase powder layer on the second substrate surface of the second build platform;
   f) consolidating all of the deposited first dry solid phase powder layer on the second substrate surface to form a first solid layer of a second object on the second build platform; and
   g) removing the second build platform with the second substrate surface from the powder material transfer station;
   wherein the first and second build platforms are joined to an outer surface of a cylinder having an axis of rotation equidistant from all points on the outer surface, and the method further comprises rotating the cylinder about its axis of rotation to cause locating of the first build platform and first substrate surface at the powder material transfer station, and to cause the removing of the first build platform with the first substrate surface from the powder material transfer station, and to cause the moving of the second build platform and second substrate surface to the powder material transfer station, and to cause the removing of the second build platform with the second substrate surface from the powder material transfer station.

16. The method of claim 15, wherein n build platforms are joined to the surface of the cylinder, each of the n build platforms comprising a substrate surface, the method comprising, for each of the n—2 additional object build platforms:
   a) rotating the cylinder about its axis of rotation to cause locating of the build platform and its substrate surface at the powder material transfer station;
   b) depositing a first dry solid phase powder layer on the substrate surface;
   c) consolidating the dry solid phase powder layer on the substrate surface to form a first solid layer of an object on the substrate surface on that build platform; and
   d) rotating the cylinder about its axis of rotation to cause the removing of that build platform with the substrate surface and first solid layer of the object on that build platform from the powder material transfer station.

17. The method of claim 16, wherein the first object, the second object, and the n—2 additional objects are each comprised of h consolidated layers, the method further comprising, for each of the first build platform, second build platform, and additional build platforms, repeating h—1 times:
   a) selecting a chosen build platform from one of the first build platform, second build platform, and additional build platforms, and moving the chosen build platform with substrate surface and consolidated solid layers of the object on the chosen build platform to the powder material transfer station;
   b) depositing an additional dry solid phase powder layer on the consolidated solid layers of the object on the chosen build platform;
   c) consolidating the additional dry solid phase powder layer with the consolidated solid layers of the object on the chosen build platform; and
   d) removing the chosen build platform from the powder material transfer station.

\* \* \* \* \*